United States Patent [19]

Horrigan, deceased

[11] 4,400,226
[45] Aug. 23, 1983

[54] METHOD OF MAKING AN INSULATED ELECTROMAGNETIC COIL

[75] Inventor: Raymond J. Horrigan, deceased, late of Erie, Pa., by Doris C. Horrigan, executrix

[73] Assignee: General Electric Company, Erie, Pa.

[21] Appl. No.: 429,731

[22] Filed: Sep. 30, 1982

Related U.S. Application Data

[62] Division of Ser. No. 283,851, Jul. 16, 1981, Pat. No. 4,376,904.

[51] Int. Cl.³ .................. H01B 13/08; H01H 85/22; H02K 3/40
[52] U.S. Cl. ......................... 156/56; 156/53; 156/185; 310/208; 336/209; 428/216; 428/473.5
[58] Field of Search .................. 156/53, 56, 185; 310/208; 336/209; 428/216, 473.5

[56] References Cited

U.S. PATENT DOCUMENTS

| | | | |
|---|---|---|---|
| 3,369,947 | 2/1968 | Mertens et al. | 156/53 X |
| 3,662,199 | 5/1972 | Anderson et al. | 310/208 |
| 3,674,615 | 7/1972 | Dardenne | 156/53 X |
| 3,735,168 | 5/1973 | Anderson et al. | 310/208 X |
| 3,770,566 | 11/1973 | Gerow et al. | 428/473.5 X |
| 3,791,909 | 2/1974 | McKee | 428/473.5 X |
| 4,265,966 | 5/1981 | Schuh | 156/53 X |
| 4,304,818 | 12/1981 | Hirata et al. | 428/413 |

Primary Examiner—Robert A. Dawson
Attorney, Agent, or Firm—Albert S. Richardson, Jr.

[57] ABSTRACT

A method of insulating an electromagnetic coil comprises the steps of wrapping first and second overlapping layers of fluorinated ethylene propylene (FEP) resin-coated polyimide tape around distal sections of the end turns of the coil, inserting conforming laminae of FEP resin-impregnated glass cloth between adjacent coil turns, wrapping at least two overlapping layers of FEP resin-coated polyimide tape around the entire coil, heating the coil to at least the resin melting point, applying pressure to compress the tape and laminae and to clamp together the respective turns of the coil, and finally cooling the coil under pressure to allow the resin to resolidify. The resulting product has a thin, uniform coating of impervious electrical insulation characterized by improved heat transfer capability and improved stability at high temperatures.

5 Claims, 6 Drawing Figures

Fig. 3.

| WRAP DISTAL SECTIONS OF END TURNS IN TWO OR MORE OVERLAPPING LAYERS OF FEP RESIN-COATED POLYIMIDE TAPE. |

| INSERT THIN, CONFORMING LAMINAE OF FEP RESIN-IMPREGNATED GLASS CLOTH BETWEEN ADJACENT TURNS OF COIL. |

| WRAP COIL REGIONS SUBTENDING DISTAL SECTIONS OF END TURNS IN TWO OR MORE OVERLAPPING LAYERS OF FEP RESIN-COATED POLYIMIDE TAPE. |

| WRAP REMAINDER OF COIL AND PORTIONS OF DISTAL SECTIONS OF END TURNS IN TWO OR MORE OVERLAPPING LAYERS OF FEP RESIN-COATED POLYIMIDE TAPE. |

| HEAT COIL UNTIL FEP RESIN MELTS. |

| APPLY PRESSURE TO COMPRESS THE TAPE, THE LAMINAE, & THE COIL TURNS. |

| COOL UNDER PRESSURE TO SOLIDIFY THE COIL ASSEMBLY. |

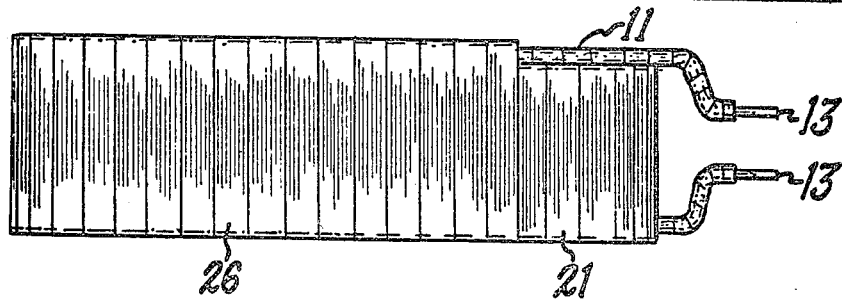

Fig. 5.

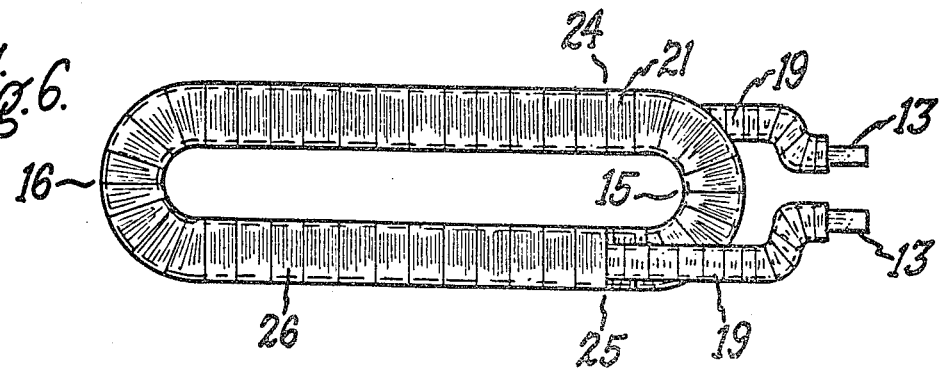

Fig. 6.

METHOD OF MAKING AN INSULATED ELECTROMAGNETIC COIL

This is a division of application Ser. No. 283,851, filed July 16, 1981, and now U.S. Pat. No. 4,376,904.

BACKGROUND OF THE INVENTION

The present invention relates to a new and improved method for the manufacture of insulated coils for electro-dynamic machines. The improved method is particularly useful for insulating field coils of large direct current machines, such as the traction motors of diesel-electric locomotives, which in operation are exposed to a very hostile environment.

A locomotive traction motor has to be able to provide long periods of full load, trouble free operation under very harsh conditions, including constant vibration, frequent mechanical shocks, infrequent maintenance, occasional electrical overloads, a wide range of ambient temperatures, and an atmosphere that can be very wet and/or dirty. Such a motor typically includes a plurality of field coils respectively mounted on pole pieces that extend radially inwardly from the magnet frame or stator of the motor. Each field coil comprises a long copper conductor of relatively large cross-sectional area (e.g., one-half square inch) that has been wound or bent to form a plurality of juxtaposed turns (e.g. 15 turns). Typically the copper conductor has a rectangular cross section and is wound edgewise, i.e., the wider side of the conductor is perpendicular to the centerline of the coil. The resulting multi-turn coil is helical in shape, and its open center or "window" is appropriately dimensioned to fit around the associated pole piece. The terminal sections of the copper conductor at opposite ends of the coil serve as relatively flexible leads that are adapted to be connected in circuit with a source of unidirectional electric current, and when energized or excited by such current the coil generates a desired magnetic field inside the motor.

Between adjacent turns of the field coil suitable insulating material is disposed so as to prevent turn-to-turn electrical short circuits, and the exposed surfaces of the whole stack of helical turns are encapsulated in such material to insulate the coil from the grounded pole piece and frame of the motor. The insulating system preferably is characterized by high dielectric strength, good heat transfer properties, both physical and chemical stability at elevated temperatures, and a high resistance to moisture and dirt. The heat transfer properties are particularly significant in traction motors where the goal is to obtain more output torque per unit of weight by increasing the current density (and hence the heat generated) in the coils.

There are several known methods of insulating field coils. A method commonly used to apply turn insulation comprises dipping the bare copper coil in a suitable shellac, placing pieces of insulating paper between adjacent turns, heating the coil so that the shellac melts into the paper, and clamping the turns of the hot coil together while the material between the turns solidifies and forms a solid bond therewith. Subsequently, ground insulation can be applied by wrapping glass cloth or mica or a combination thereof around the outside of the whole stack of turns, vacuum-pressure impregnating the wrapped coil with a polyester resin varnish, and baking the coil to cure the varnish to a solid condition. The latter two steps are usually repeated at least once so as effectively to seal the coil and prevent penetration of contaminants such as dirt and moisture. While it is technically sound and has proven successful, this prior art method requires a relatively large number of steps, uses an undesirable amount of energy, and results in the build up of a thick insulation layer that undesirably impedes the dissipation of heat generated in the coil.

Alternative methods have heretofore been used to apply the ground insulation. In one, mica tape or the like is wound around the coil in successive layers with a protective covering of glass tape overlaying the mica tape. Afterwards, the coil is assembled on its pole piece, the pole piece is bolted in the motor frame, and the completed assembly is vacuum pressure impregnated with varnish to improve moisture resistance and to aid heat transfer. In another known method, the coil turns are completely encased in a composite insulation of glass cloth, mica mat, and epoxy resin which are molded under heat and pressure to form the ground insulation. The finished coil is hard and inflexible, requiring spring pads between the pole tips and the coil to maintain a tight assembly in the motor.

An insulating material that is particularly advantageous for traction motor applications is known generically as polyimide film, and it is manufactured and sold by the DuPont Company under the trademark "Kapton." Thin gauge Kapton insulation has a relatively high dielectric strength and remains stable at elevated temperatures. It can be coated with Teflon ® FEP-fluorocarbon resin to provide a heat-sealable surface on the base of polyimide film. This also improves the chemical resistance of the film and reduces the rate of moisture permeability and of oxidative decomposition. Such composite material has been heretofore used successfully to insulate rectangular motor magnet wire and to insulate the turns of large current smoothing reactors.

SUMMARY OF THE INVENTION

A general objective of the present invention is to provide, for insulating multi-turn helical coils, a new and improved method which is less expensive and more energy efficient than the above-mentioned prior art methods.

In carrying out the invention in one form, distal sections of an edgewise-wound helical field coil are wrapped in first and second overlapping layers of fluorinated ethylene propylene (FEP) resin-coated polyimide tape, thin laminae of FEP resin-impregnated glass cloth are inserted between adjacent turns of the coil, the turns of the coil, including a first portion but not all of the distal section of each end turn, are wrapped in an inner layer of FEP resin-coated polyimide tape, at least one additional layer of said tape is wrapped around the coil so as to cover the aforesaid inner layer and a second portion of the distal section of each end turn, the coil is heated until the FEP resin melts, pressure is applied to clamp the coil turns together and to compress the overlying layers of polyimide tape, and the coil is cooled so that the resin resolidifies and bonds the tape and laminae to the respectively contiguous surfaces of the coil turns.

The invention will be better understood and its various objects and advantages will be more fully appreciated from the following description taken in conjunction with the accompanying drawings.

BRIEF DESCRIPTION OF THE DRAWINGS

FIG. 3 is a flow chart describing the steps of the improved method for insulating the field coil;

FIG. 4 is a perspective view of the insulating pieces disposed between a pair of adjacent turns of the coil; and FIGS. 5 and 6 are reduced-scale side elevation and plan views, respectively, of the field coil fully insulated in accordance with the improved method of this invention.

DESCRIPTION OF THE PREFERRED EMBODIMENT

Figure 1:
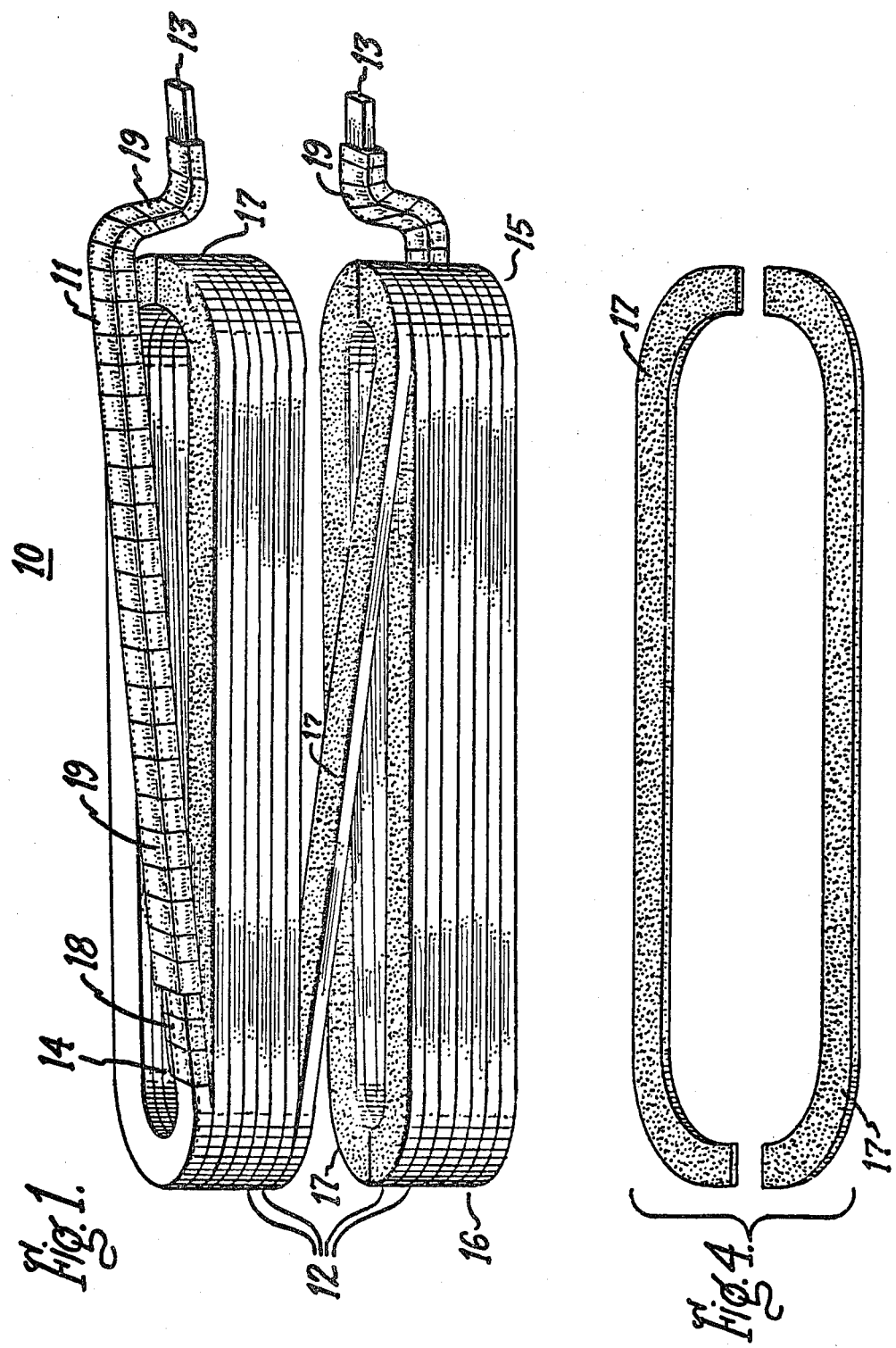
FIG. 1 is a perspective view of an edgewise wound field coil during manufacture, with the distal section of the top end turn being covered with overlapping layers of insulating tape and with two of the coil turns being separated to reveal thin pieces of insulating material that are disposed between adjacent turns.
Figure 2:
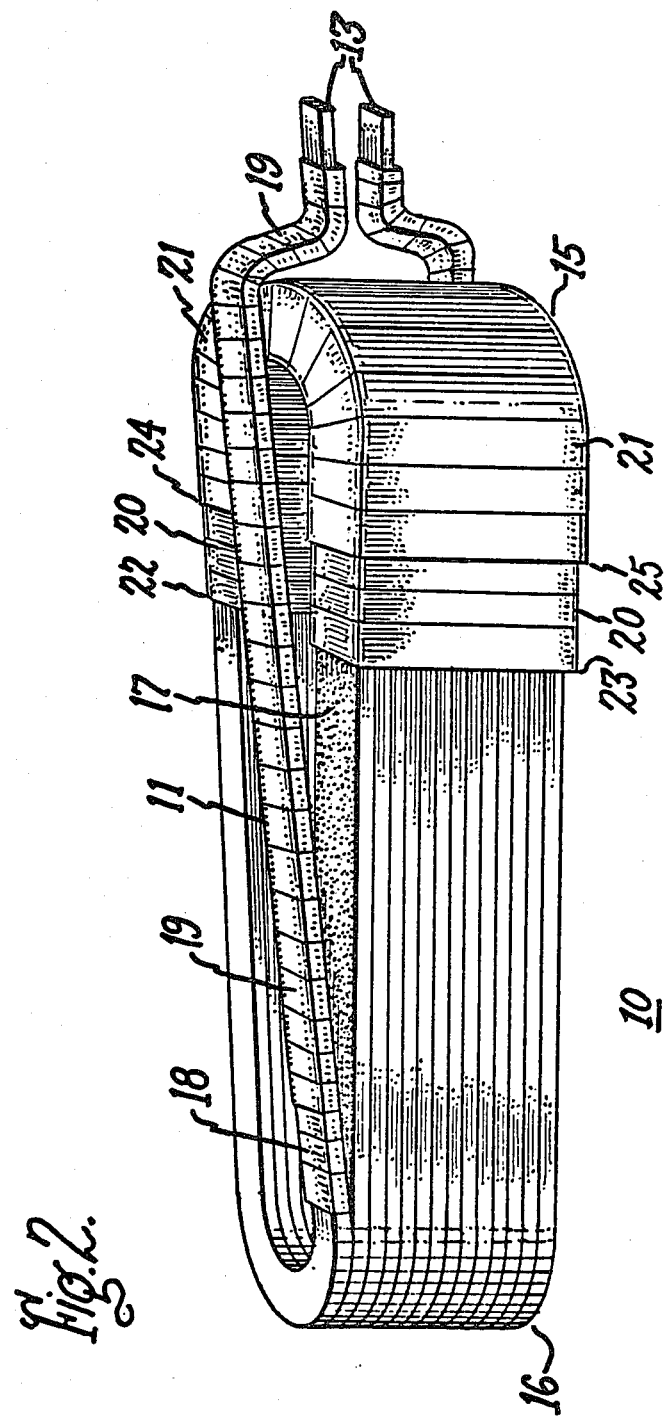
FIG. 2 is a perspective view of the FIG. 1 coil at a later stage of the manufacturing process, with overlapping layers of insulating tape having been wrapped around regions of the coil subtending the distal sections of the end turns.

A helical electromagnetic coil 10 is shown in FIGS. 1 and 2. To make this coil, a bare copper conductor or strap of rectangular cross section is wound in an edgewise fashion to form a plurality of serially connected turns 12. In the illustrated embodiment, the configuration of each of the turns 12 of the coil 10 is generally oblong, and the stack of turns is seen to have two curved sides 15 and 16 and two straight, parallel sides. The first straight side 11 of the turn at each of the opposite ends of the stack is herein referred to as the distal section of the end turn, and it is integrally joined to a terminal lead 13 that extends beyond the boundary of the coil. The two terminal leads 13, which preferably are simply tangential extensions of the distal sections 11 of the respective end turns, provide means for connecting the coil 10 in an external electrical circuit that supplies excitation current to the coil. Preferably, as shown in the drawings, one of the end turns of the coil is less than a full turn, and the free ends of both terminal leads 13 are bent into generally parallel, spaced apart relationship with one another at the curved side 15 of the coil.

When properly insulated the coil 10 is useful in a direct durrent electrodynamic machine as a commutating field coil. In one practical application of the present invention the coil 10 was characterized by 14 turns of a rectangular copper conductor having a width of 0.7 in. and a thickness of 0.15 in., with the helical stack of turns being approximately two inches high. The outside dimensions of this coil were approximately 9.2 in. $\times$ 2.5 in., and the inside (i.e., window) dimensions were approximately 7.8 in. $\times$ 1.0 in.

FIG. 3 illustrates, in flow chart form, the steps of an improved process for insulating the coil 10. As will be described in more detail hereinafter, the method comprises the steps of wrapping the distal sections 11 of the opposite end turns of the coil in two or more overlapping layers of flourinated ethelene propylene (FEP) resin-coated polyimide tape in a half-lap fashion, inserting thin, conforming laminae 17 of FEP resin-impregnated glass cloth between adjacent coil turns, wrapping a first part of the coil, including the curved side 15 and regions that subtend the distal sections 11 of the end turns, in two or more overlapping layers of FEP resin-coated polyimide tape in a half-lap fashion, wrapping the remainder of the coil and portions of the distal sections 11 in two or more overlapping layers of FEP resin-coated polyimide tape in a half-lap fashion, heating the coil so that the FEP resin melts, applying pressure to the coil so as to clamp the coil turns together and to compress the laminae and the tape, and finally cooling the coil assembly under pressure until the whole assembly solidifies.

More specifically, and as shown in FIG. 1, the FEP resin-coated polyimide tape is wrapped around the distal section 11 of each end turn of the coil 10 and around each of the terminal leads 13 so as to cover the bare surfaces of the sections 11 and the leads 13 with first layers 18 of such tape. The first layer 18 of this insulating tape on each distal section 11 and terminal lead 13 is then covered with at least one additional overlying layer 19 of the same tape.

To form each of the overlapping layers 18 and 19, the tape is wrapped in a half-lap fashion, i.e., each turn of the tape covers or laps approximately half the width of the preceding taped turn. Thus each layer actually comprises a double thickness of tape. The wrapping can be done by hand or by machine. If a machine were used, the tape could be easily wrapped in two-thirds lap or even three-quarters lap fashion (rather than the presently preferred half-lap), thereby forming 3-ply or 4-ply layers of tape when desired. In the illustrated embodiment, there are only two 2-ply layers 18 and 19 of tape on the distal sections 11 and terminal leads 13 of the coil turns. If the dielectric strength of this composite covering of insulation were inadequate, another layer of tape could be added or more plys per layer could be used, at the cost of increasing the thickness of insulation and hence reducing its heat transfer capability.

Preferably the end of the outer layer 19 of tape is set back from the corresponding end 14 of the first layer 18 on the distal section 11 of each end turn of the coil, whereby there is a staggered reduction of insulation near position 14. In the finished coil this results in a less abrupt reduction in heat dissipation from the region of the distal section 11 covered by layer 18 near position 14. It will be apparent that for the purpose of illustration the thickness of each layer of tape has been greatly exaggerated in the drawings.

Preferably the insulating tape comprises a thin base of shrinkable polyimide film having a thickness of approximately two mils and coated on at least one side with FEP resin. The thickness of this resin coating is approximately one-half mil. The tape used for the first or inner layer can be resin-coated on both sides to facilitate its adhesive bonding to the overlying or outer layer of tape and to the contiguous surface of the copper conductor. The tape used for the outer layer need be resin-coated on only one side. In the presently preferred embodiment, however, the same tape (coated on both sides) is used to form both the inner and outer layers inasmuch as a single standard type of resin-coated tape can then be employed. The DuPont Company sells a FEP resin-coated polyimide ("Kapton") tape type HF929 which, when stretched to provide the desired shrinkability, is well suited for this purpose. HF929 tape is described in DuPont Technical Information Bulletin HF-1.

After the distal sections of the respective end turns of the coil 10 are wrapped in overlapping layers of the FEP resin-coated polyimide tape, thin laminae 17 of FEP resin-impregnated glass cloth are inserted between adjacent turns of the coil to provide turn-to-turn insulation. To permit insertion of the laminae 17 the coil turns can be pulled apart slightly, as indicated in FIG. 1. In the illustrated embodiment, as can be seen in FIG. 4, there are two laminae 17 between each pair of adjacent coil turns, with each laminae conforming to the shape of a half turn. Alternatively, one whole-turn lamina can be used.

Preferably each of the insulating laminae 17 is cut from a glass-fiber cloth base, having a thickness of approximately eight mils, which has been saturated with FEP resin. The resin permeates the glass cloth and thinly coats its opposite sides. The glass cloth need not have a high dielectric constant inasmuch as the electrical potential difference between adjacent turns of the coil is relatively low, (e.g., less than 3 volts). The FEP resin coating facilitates adhesive bonding of the laminae to the respectively contiguous surfaces of the copper turns between which they are inserted.

The next step in the insulating method of this invention is to wrap the FEP resin-coated polyimide tape around a first part of the coil 10 to form an inner layer 20 of such tape on the exposed surfaces of this part. As can be seen in FIG. 2, the part of the coil that is covered by the inner layer 20 extends from position 22 around the curved side 15 of the coil to position 23 and it includes regions of the coil subtending each of the distal sections 11 of the opposite end turns. However, the part covered by layer 20 excludes the distal sections themselves. After the inner layer 20 is completed, a central portion of it is covered with at least one additional layer 21 of FEP resin-coated polyimide tape. The additional or outer layer 21 extends between positions 24 and 25 which are respectively set back from the above-mentioned positions 22 and 23, whereby the ends of the outer layer 21 are staggered with respect to the ends of the inner layer 20. In the preferred embodiment, each of the overlapping layers 20 and 21 is formed by wrapping the tape in a half-lap technique, and the tape is essentially the same as the tape used to wrap the distal sections 11 of the end turns.

To complete the ground insulation on the coil 10, the remainder of the coil is wrapped in a similar fashion with the same kind of FEP resin-coated polyimide tape as previously employed. More specifically, the tape is wrapped around a second part of the coil, which part includes a first portion of the distal section 11 of each of the end turns and all exposed surfaces of the coil that were not covered by the above-mentioned inner layer 20 of tape, thereby covering the second part with another inner layer of tape. While not shown in FIG. 2, it will be apparent that the latter inner layer of tape begins by overlapping half the width of the first turn of tape at the end 22 of the inner layer 20 and extends around the curved side 16 of the coil to the position 23 where it overlaps half the width of the last turn of tape at this end of the layer 20. In other words, the inner layer of tape on the second part of the coil covers the first and last half lap of the inner layer of tape on the first part of the coil. As a result, the whole coil (except the areas around the distal sections 11 of its end turns) is surrounded by an inner layer of 2-ply insulating tape havng a nearly uniform thickness. The inner layer of tape on the second part of the coil is then covered with at least one additional layer 26 of FEP resin-coated polyimide tape which is wrapped so as to overlap the previously uncovered portions of the inner layer 20 on the first part of the coil. The additional or outer layer 26 begins by overlapping half the width of the first turn of tape at the end 24 of the outer layer 21 on the first part of the coil and extends around the curved side 16 to the position 25 where it overlaps half the width of the last turn of tape at this end of the outer layer 21. In other words, the outer layer 26 of tape covers the first and last half lap of the outer layer 21 on the first part of the coil. The outer layer 26 also overlaps the two layers of tape covering a second portion of the distal section 11 of each end turn of the coil. The aforesaid second portion is that portion of the distal section of the top end turn extending over the inner layer 20 of tape between positions 23 and 25 (see FIG. 2), and it is that portion of the distal section of the bottom end turn traversing the inner layer 20 between positions 22 and 24.

FIGS. 5 and 6 show the coil 10 wrapped in the overlapping layers of insulating tape. By staggering the ends of the inner and outer layers (20 and 21) that cover the terminal side 15 of the coil and by half lapping these ends with the corresponding ends of the inner and outer layers that cover the remainder of the coil, bulges in the ground insulation are avoided except where the taped distal sections 11 of the end turns of the coil are covered by the outer layer 26, and therefore the thickness of this insulation is nearly uniform. As an aid to handling the coil before the ground insulation is applied, a strip of pressure-sensitive adhesive material can be used for temporarily binding the coil turns together, which strip is subsequently removed as the taping progresses.

After the coil is wrapped in the insulating tape as described above, it is placed in a press (not shown) with mold blocks inserted in the coil window. One function of the mold blocks is to size the window of the coil during the ensuing steps of the insulating method, and this is facilitated by the minimal flow of the FEP resin when heated to its melting or fusing point. Another function is to apply pressure to interior sides of the coil, for which purpose the adjoining parts of the mold blocks are "V" or wedge shaped so that the blocks expand laterally as one block is moved axially with respect to the other during the pressure-applying step described below. A small gap between the mold blocks and the sides of the coil window is filled with thin pieces of silicone rubber or the like, and the faces of the press platens are covered with similar material, to minimize heat loss and to ensure uniform pressure as the coil is heated and pressure is applied.

Once the coil is properly positioned between the press platens, the assembly is quickly heated in any one of a number of well known ways to at least the melting point of the FEP resin. One particular method of heating the coil is by supplying electric current to its copper turns. For example, to fuse the insulation surrounding a commutating pole coil, direct current having an initial magnitude of 1,000 amperes was supplied for four minutes, and the magnitude was then reduced to 600 amperes until the coil temperature was raised to a level between 350° and 400° C., which is sufficient to melt the resin. The total heating time was less than seven minutes. An alternative approach is to use induction heating. At or above its melting point, the resin in the tape and laminae spreads or flows into any and all voids under or between the overlapped layers of tape, it acts as an adhesive, and it provides a heat-sealable surface on the non-melting polyimide base of the tape. The polyimide base itself tends to shrink during the heating step.

As the temperature of the wrapped coil 10 approaches the melting point of the FEP resin, pressure is applied to the external surfaces of the coil, including both the top and bottom ends and both the exterior and interior sides of the coil. This clamps the coil turns together, compresses the laminae between turns, compresses and thereby laminates the two layers of insulating tape wrapped around the stack of turns, molds the tape to the configuration of the coil, and assures the desired bonding between insulation and contiguous surfaces of the copper turns. Although the height of the coil is slightly decreased by applying pressure to the stack of turns, the concurrent shrinkage of the polyimide tape ensures that the ground insulation covering the coil remains tight and wrinkle free. Only light contact pressure is required to adhere the inner layer of ground insulation and the insulating laminae between turns to the respectively contiguous turns of the coil. Simultaneously with applying pressure, the heating step of the method is terminated so that the coil can begin to cool down.

After the relatively brief heating period and while pressure is still applied, the coil is cooled to a temperature which permits the resin to resolidify. The press platens that are applying pressure to the coil and the mold blocks in its window now serve as relatively cool sinks to which the heat stored in the coil can flow. If desired, a forced cooling system can be added to the press and mold blocks to shorten the cooling step of the method. When the resin resolidifies, at a temperature just under 220° C., it unites with the copper, glass cloth, and polyimide tape, thereby tightly bonding the adjacent turns of the coil to one another and the polyimide insulation to the whole stack of turns. Now the pressure is removed from the coil and the coil is removed from the press. If desired, Nomex pieces having a relatively high impact strength can be applied to the opposite ends of the coil with room temperature vulcanizing (RTV), or room-temperature-curing, silicone adhesive to protect the ground insulation during subsequent handling. The total thickness of the ground insulation covering the coil 10 at the conclusion of this process is approximately 12 mils.

An insulating system using polyimide film applied by the method of this invention completely seals the coil against moisture and dirt. The ground insulation is free of voids and is much thinner than the layer of insulation covering typical prior art edge-wound field coils in traction motors. Specifically, the improved ground insulation is only approximately 12 mils thick compared to a typical prior art thickness of approximately 40 to 50 mils. This results in a superior heat transfer capability. In addition, the FEP resin-coated polyimide tape is more stable at elevated temperatures (e.g., 250° C.) than the prior art insulating materials. Consequently, when a field coil is insulated by the improved method of this invention its current density can be appreciably increased.

Furthermore, the total number of steps and the time required to insulate the field coil have been significantly reduced. In particular, the multiple varnish treatment steps and curing cycles which are used in the typical prior art insulating method have been omitted. In the improved method of this invention, a maximum period of approximately fifteen minutes at an elevated temperature is adequate to fuse the insulation, whereas the prior art varnish curing step usually requires baking the insulated coil for periods of eight to 12 hours. When considered in terms of the energy used, the heating time in the present invention results in a significant cost savings.

It is to be understood that the thicknesses of the FEP resin coating and the underlying polyimide film are not restricted to approximately 0.5 and 2.0 mils, respectively, nor are the number of layers of tape intended to be limited to only two. Rather, the thickness selected and the number of layers of such tape used will depend upon a number of well known factors that may vary from case to case.

It is, however, important to note that the tape should be wrapped so that overlapping outer and inner layers are staggered as hereinbefore described and so that the two adjacent inner layers overlap slightly to form a flush surface. As a result there is a nearly uniform thickness of insulation around the coil, and no one insulated area, except for the areas around the distal sections 11 of the end turns, will be thinner or thicker than any other insulated area. This promotes an even distribution of heat flow through the insulation. If the outer layer of tape were FEP resin-coated on only one side, a strip of polyimide tape coated with such resin on both sides can be inserted under the distal section 11 of each end turn before taping the remainder of the coil so as to help seal the gap between the distal section and the coil turn that immediately subtends the distal section.

While a preferred embodiment of the invention has been shown and described, various other embodiments and modifications will be apparent to persons skilled in the art. The concluding claims are therefore intended to cover all such modifications as fall within the true spirit and scope of the invention.

What is claimed is:

1. For insulating a helical electromagnetic coil comprising a plurality of turns, the two turns at opposite ends of the coil having distal sections that are integrally joined, respectively, to a pair of terminal leads extending beyond the boundary of the coil to provide means for connecting the coil in an electrical circuit, an improved method comprising the steps of:
   a. wrapping a fluorinated ethylene propylene resin-coated polyimide tape around the distal section of each end turn of said coil and around each of said terminal leads, thereby covering the bare surfaces of said sections and said leads with first layers of such tape;
   b. covering said first layer on each distal section and each terminal lead with another layer of said tape;
   c. inserting between adjacent turns of said coil thin laminae of fluorinated ethylene propylene resin-impregnated glass cloth which conform to the shape of said turns;
   d. wrapping said tape around a first part of said coil to form an inner layer of such tape on the exposed surfaces of said first part, said first part excluding the distal sections of both of said end turns but including regions of said coil subtending each of said distal sections;
   e. covering a central portion of said inner layer on said first part of said coil with at least one additional layer of said tape;
   f. wrapping said tape around a second part of said coil so as to cover said second part with another inner layer of tape, said second part including a first portion of the distal section of each of said end turns and all exposed surfaces of said coil that were not covered by the first-mentioned inner layer of tape;

g. covering said last-mentioned inner layer on said second part of said coil with at least one additional layer of said tape which is wrapped so as to overlap any previously uncovered portions of the inner layer of tape on said first part of said coil and the layers of tape covering a second portion of the distal section of each end turn of said coil;

h. heating said coil to at least the melting point of said resin;

i. applying pressure to the external surfaces of the various layers of tape on said coil;

j. cooling said coil to allow said layers of tape and said laminae to bond to the respectively contiguous turns of said coil; and k. removing said pressure after said resin resolidifies.

2. The improved method as set forth in claim 1 wherein said tape comprises a polyimide base having a thickness of approximately two mils and a fluorinated ethylene propylene resin coating having a thickness of approximately one-half mil on both sides of the polyimide base.

3. The improved method of claim 1 or 2 wherein each of said laminae comprises a cloth of glass fiber having a thickness of approximately eight mils, said cloth being saturated with a fluorinated ethylene propylene resin.

4. The improved method of claim 1 wherein each layer of tape is wrapped in a half-lap fashion.

5. The improved method of claim 1 in which the overlapping layers of tape on the distal section of each end turn of said coil are staggered with resepct to each other by setting back from the end of the first layer on each distal section the corresponding end of the other layer that covers said first layer.

* * * * *